(12) United States Patent
Swinderman

(10) Patent No.: US 8,028,819 B1
(45) Date of Patent: Oct. 4, 2011

(54) CONSTANT PRESSURE AND VARIABLE CLEANING ANGLE SCRAPER BLADE AND METHOD FOR DESIGNING SAME

(75) Inventor: Robert Todd Swinderman, Kewanee, IL (US)

(73) Assignee: Martin Engineering Company, Neponset, IL (US)

(*) Notice: Subject to any disclaimer, the term of this patent is extended or adjusted under 35 U.S.C. 154(b) by 492 days.

(21) Appl. No.: 11/849,419

(22) Filed: Sep. 4, 2007

Related U.S. Application Data

(60) Provisional application No. 60/824,399, filed on Sep. 1, 2006.

(51) Int. Cl.
  *B65G 45/00* (2006.01)
  *B65G 45/12* (2006.01)
(52) U.S. Cl. .................. 198/499; 198/494; 198/498
(58) Field of Classification Search .............. 198/494, 198/498, 499
  See application file for complete search history.

(56) References Cited

U.S. PATENT DOCUMENTS

| | | | |
|---|---|---|---|
| 4,917,231 A | | 4/1990 | Swinderman |
| 5,032,229 A | * | 7/1991 | Boucher ............... 162/281 |
| 6,439,373 B1 | | 8/2002 | Swinderman |
| 6,619,469 B2 | | 9/2003 | Malmberg |

* cited by examiner

*Primary Examiner* — Gene Crawford
*Assistant Examiner* — Kavel Singh
(74) *Attorney, Agent, or Firm* — Thompson Coburn LLP; Clyde L. Smith

(57) ABSTRACT

A scraper blade for a conveyor belt cleaner is provided. The scraper blade being adapted, when appropriately tensioned against a conveyor belt, to maintain a plurality of predetermined cleaning angles, relative to the conveyor belt, as the scraper blade is progressively worn down through contact with the conveyor belt, the scraper blade having a first blade section and a second blade section. The first blade section is proximate a distal end of the scraper blade, the first blade section being configured to maintain a first predetermined cleaning angle relative to the conveyor belt. The second blade section substantially adjacent the first blade section, the second blade section being configured to maintain a second predetermined cleaning angle, relative to the conveyor belt, after the first blade section is worn away through contact with the conveyor belt. The second predetermined cleaning angle is different than the first predetermined cleaning angle. The first blade section and the second blade section each define a profile which approximately corresponds to a volute of a circle. Processes and computer implemented processes for designing outer profiles and inner profiles of primary scraper blades and secondary scraper blades are also provided.

7 Claims, 17 Drawing Sheets

| INPUTS, n-5 | ☒ |
|---|---|
| CA1 (CLEANING ANGLE 1) = | ____° —221 ◄—220 |
| CA2 (CLEANING ANGLE 2) = | ____° —222 |
| CA3 (CLEANING ANGLE 3) = | ____° —223 |
| CA4 (CLEANING ANGLE 4) = | ____° —224 |
| CA5 (CLEANING ANGLE 5) = | ____° —225 |
| INNER PROFILE OFFSET = | ____ mm —226 |
| | [CREATE BLADE DESIGN] —227 |

*FIG. 23*

| BEGIN PRESSURE CALCULATIONS | ☒ |
|---|---|
| P (PRESSURE ESTIMATE) = | ____ psi —231 ◄—230 |
| TL (TENSIONER LENGTH) = | ____ in —232 |
| W (BLADE WIDTH) = | ____ in —233 |
| | [PICK A SPRING CONSTANT] —234 |

*FIG. 24*

| CHOOSE A SPRING CONSTANT | ☒ |
|---|---|
| THE CALCULATED AVERAGE SPRING CONSTANT = | 23.34554362888 lb/in —241 ◄—240 |
| K (CHOSEN SPRING CONSTANT) = | ____ lb/in —242 |
| SPRING COMPRESSION RATIO = | ____ —243 |
| | [FINALIZE BLADE DESIGN] —244 |

*FIG. 25*

CONSTANT PRESSURE AND VARIABLE CLEANING ANGLE SCRAPER BLADE AND METHOD FOR DESIGNING SAME

CROSS-REFERENCE TO RELATED APPLICATIONS

This application claims the benefit of U.S. Provisional Application No. 60/824,399, filed Sep. 1, 2006, the entirety of which is hereby incorporated by reference.

BACKGROUND OF THE INVENTION

1. Field of the Invention

The present invention relates to scraper blades which are used to remove residual material clinging to the return run of a conveyor belt and, in particular, to primary scraper blades used in pre-cleaner applications located at the head pulley of the conveyor belt. The present invention also relates to processes and methods of designing both primary and secondary scraper blades.

2. Background Art

Scraper blades were previously made such that just the scraping edge of the blade face surface initially engaged the conveyor belt, rather than the entire or full blade face surface, when installed. This edge contact type of blade design cleans with high efficiency when new, but after the blade wears for a short period of time cleaning effectiveness is lost. Scraper blades that provide full-face contact between the face surface of the blade and the conveyor belt, such as those of the present invention, can be designed to maintain constant cleaning efficiency over their wear life. Full-face contact blades extend the life of the blade, particularly on high speed conveyors because a full-face contact blade has more mass to absorb the heat of friction generated with the rotating belt. Full-face blades also eliminate a problem known as feathering which occurs with primary cleaner blades when just the scraping edge engages the belt.

During operation, the scraping edge and the scraping surface of each scraper blade wears due to its scraping engagement with the rotating conveyor belt. The tensioner rotates the cross shaft and the scraper blades to maintain the scraper blades in biased scraping engagement with the conveyor belt. As the scraper blades wear and are rotated into continuing engagement with the conveyor belt, the orientation of the scraper blades with respect to the conveyor belt changes, which typically causes a change in the cleaning angle between the surface of the conveyor belt and the front surface of the scraper blade at the scraping edge, and a change in the scraping pressure with which the scraper blade engages the conveyor belt.

U.S. Pat. No. 4,917,231 is owned by the applicant herein and is incorporated herein by reference and discloses a constant angle conveyor belt cleaner. A scraper blade is disclosed having a curvilinear scraping face and a rear face. A tip face extends between rear face and the scraping face. The tip face and the scraping face meet at a scraping edge. The scraper blade, belt and pulley define a cleaning angle. The cleaning angle is the tangent angle formed between the tangent of the belt at the point of contact by the scraper blade, and the line extending from a distal end of the scraper blade in a direction toward the belt and head pulley. The scraper blade maintains a constant cleaning angle throughout the wear life of the blade. U.S. Pat. No. 6,439,373 is assigned to the instant assignee herein and is incorporated herein by reference and discloses a constant angle and pressure conveyor belt cleaner and tensioning arrangement. A scraper blade is disclosed having a front surface, a rear surface, and a blade face surface. The blade surface is curved to conform to the curvature of the conveyor belt such that the entire blade face surface will engage the belt in full-face contact. The blade provides a curve which defines an involute of a circle.

U.S. Pat. No. 6,457,575 is assigned to the instant assignee herein and is incorporated herein by reference and discloses a self-locking pin mounting arrangement for conveyor belt cleaner scraper blades. U.S. Patent Application Publication Nos. 2006/0108200, 2006/0108201, 2006/0108202, and 2006/0108203 show various methods of coupling a scraper blade to conveyor belt cleaner, and are incorporated herein by reference.

It is an object of the present invention to provide scraper blades that last longer in operation than many prior art scraper blades. It is also an object of the present invention to provide scraper blades which accommodate smaller size pulleys and yet provide satisfactory wear life. In applications with smaller pulleys where the mounting distance is approximately ¼ of the diameter or less, the shape of the blade with just a single cleaning angle often becomes unusable. In this application, smaller pulleys are considered pulleys having a diameter of approximately between 1 inch to 16 inches. It is also an object of the present invention to provide methods and processes for automating the design of the profile of scraper blades.

BRIEF SUMMARY OF THE INVENTION

Accordingly, in the present invention, the scraper blade has a curve which defines a volute of a circle, thereby providing a scraper blade with a longer front surface for a given scraper blade location. The scraper blade includes a blade member having a front surface which includes three curve sections each having three distinct cleaning angles. In particular, the scraper blade provides a distal curve section, an intermediate curve section and a proximate curved section. In one embodiment the angle of the distal curve section, intermediate curve section and the proximal curve section are 50, 45 and 40 degrees, respectively. In one embodiment, each of the three cleaning angle sections is used for approximately 15 degrees of rotation before wearing down to the next cleaning angle section. Thus the total rotation for full wear of the three cleaning angle sections is 45 degrees. The present invention anticipates other cleaning angle combinations. In addition, the present invention anticipates other rotation angles other than 45 degrees. For example, rotation angles from 20 degrees to 45 degrees are included in the rotation angles for pre-cleaner applications with urethane as the wear material. The goal is to maximize the percentage of the urethane blade volume for wear than the connecting or mounting means. The present invention is particularly suited for smaller pulley diameters. The angle of rotation for full wear is more a function of efficient utilization of the expensive wear material.

To specify a prior art scraper blade having a curve which defines an involute of a circle, the design parameters need only require the diameter of the pulley and the center of rotation of the blade. For the present invention, the design parameters require the diameter of the pulley, the center of rotation and the starting point (height of the blade) of the curve on the pulley relative to the center of rotation. In a preferred embodiment, a curve which defines a volute of a circle is provided separately for each blade curve section.

In one embodiment, the cleaning angles are selected which provide a positive (peeling) rake angle. In another embodiment, the selected cleaning angles provide a negative (scraping) rake angle. The range of angles typically may extend from a negative rake angle of 10 degrees to a positive rake angle of 50 degrees. The selection is based on a variety of factors such as belt condition, splice condition and rotation of the belt cleaner from the belt. The cleaning angle is the tangent angle at the point of contact. The use of a distal edge at a specific point of contact defining the cleaning angle is simple to allow a graphic solution.

In one embodiment, the blade cleaning angles are defined by using equations of the curve that define the cleaning angle at every point of contact as the blade wears. In another embodiment, 5 degree intervals are selected, the contact points are defined at the desired angle, and then a smooth curve is drawn through the contact points. This approach produces a curve which is very close to the theoretically correct solution with a small error.

In one embodiment, the scraper blade is made of urethane for wear material. However, the scraper blade may be made of other elastomer materials such as rubber.

The present invention also comprises processes for automating the design of the profiles of scraper blades, including computer-implemented design automation. Processes for the automation of the design of both primary and secondary type scraper blades are provided by the present invention. Inputs to the design automation process include type of blade to be designed, pulley diameter, blade height, mounting offset, number of segments in the design to be generated, and total blade rotation angle. Both inner and outer surface profile design automation are provided. Simulated forces and pressures on automation-designed scraper blades, given user-specified tensioner length, blade width, average spring constant, and spring compression ratio, are modeled and analyzed. After automated design of a scraper blade profile, the designer is given the ability to manually modify the automatically generated design, and to view force and pressure analyses of the manually modified design.

BRIEF DESCRIPTION OF THE SEVERAL VIEWS OF THE DRAWINGS

FIG. 23 is another design parameter input dialog of the scraper blade design automation tool;

FIG. 24 is a pressure simulation parameter input dialog of the scraper blade design automation tool;

FIG. 25 is a spring tensioner simulation parameter input dialog of the scraper blade design automation tool;

DETAILED DESCRIPTION OF THE INVENTION

Figure 1:
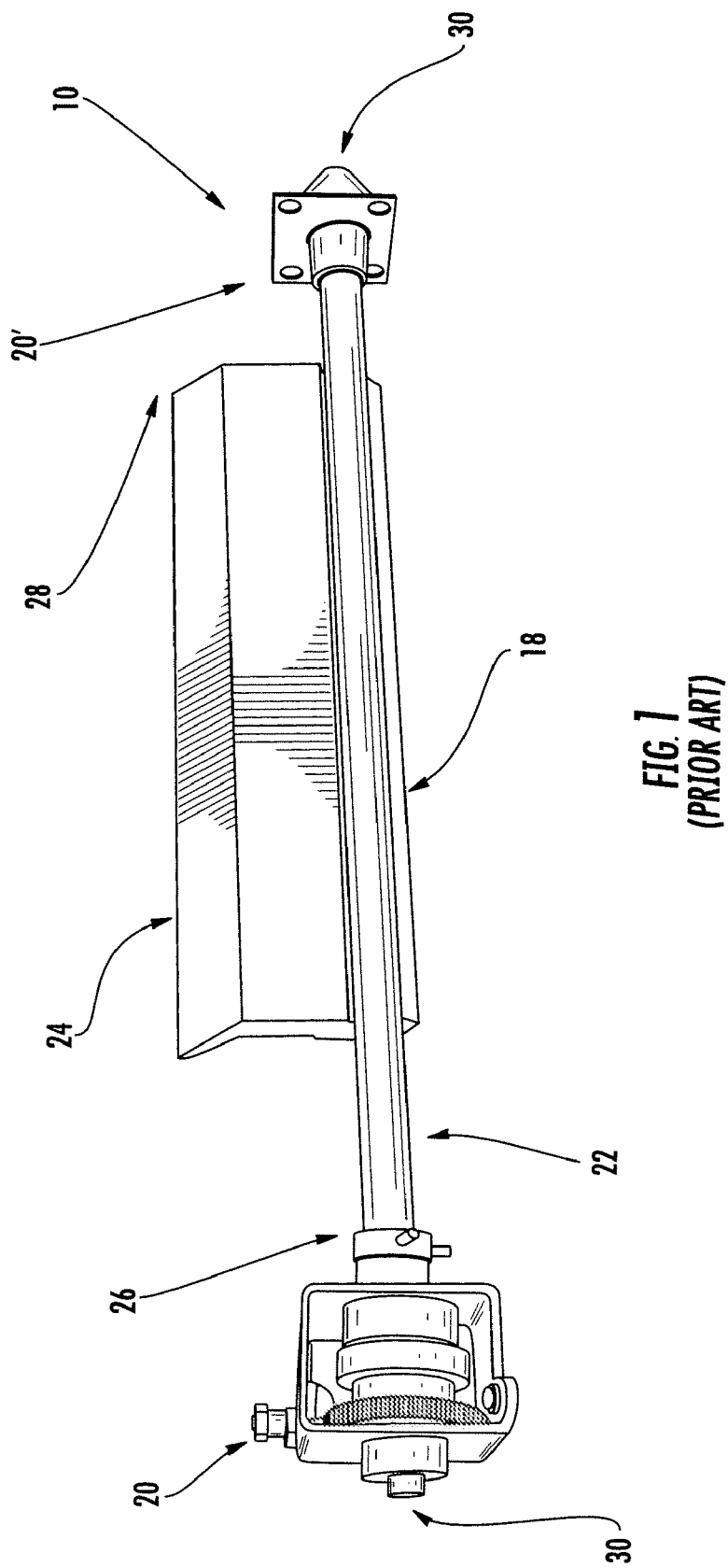
FIG. 1 is a perspective view of a prior art conveyor belt cleaner and tensioner arrangement.
Figure 2:
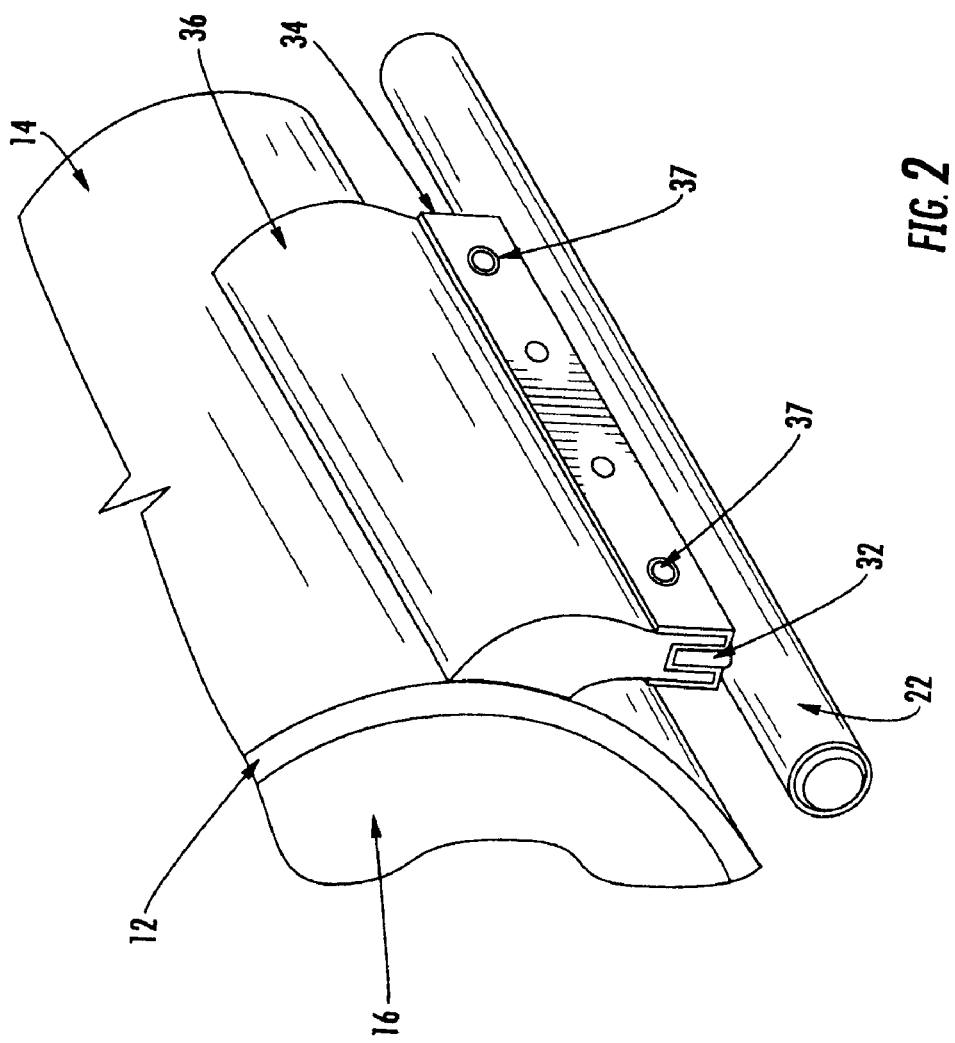
FIG. 2 is a conveyor belt and pulley together with a conveyor belt cleaner in accordance with the present invention.

The conveyor belt cleaner and tensioning arrangement 10, shown in FIG. 1, is adapted for use in connection with a conveyor mechanism. As shown in FIG. 2, the conveyor mechanism includes a rotatable endless conveyor belt 12 having an outer surface 14 that is adapted to transport bulk material. The bulk material is discharged from the conveyor belt 12 at a generally cylindrical head pulley 16 about which the conveyor belt 12 is partially wrapped. The rotatable head pulley 16 and the discharge end of the conveyor belt 12 are located within a conveyor chute which forms part of the conveyor mechanism. The conveyor chute includes a first chute wall and a spaced apart and generally parallel second chute wall. The first and second chute walls form a chamber located therebetween in which the head pulley 16 and discharge end of the conveyor belt 12 are located.

The conveyor belt cleaner and tensioning arrangement 10 includes a conveyor belt cleaner 18 and one or more conveyor belt cleaner tensioners 20. As shown in FIG. 1, the conveyor belt cleaner and tensioning arrangement 10 includes a first conveyor belt tensioner 20 and a second conveyor belt tensioner 20' that are constructed substantially identical to one another.

As shown in FIG. 1, the conveyor belt cleaner 18 includes a cross-shaft or support frame 22 and a prior art full-face contact scraper blade 24 that is removably connected to the support frame 22. The support frame 22 includes a first end 26, a second end 28, and a central longitudinal axis 30 which extends from the first end 26 to the second end 28.

A mounting bar 32, such as shown in FIG. 2, is attached to the support frame 22 via any suitable means, such as welding or fasteners (not shown). A blade support 34, also shown in FIG. 2, receives the scraper blade 36 of the present invention. The blade support 34 and scraper blade 36 are secured to the mounting bar 32 via any suitable means, such as fasteners 37 and pins. However, the mounting bar 32 and blade support 34 are only one example of mounting the scraper blade 36 to the conveyor belt cleaner 18. Refer to the patents identified above for additional details and examples of removably securing the scraper blade 36 to the conveyor belt cleaner 18.

Figure 3:
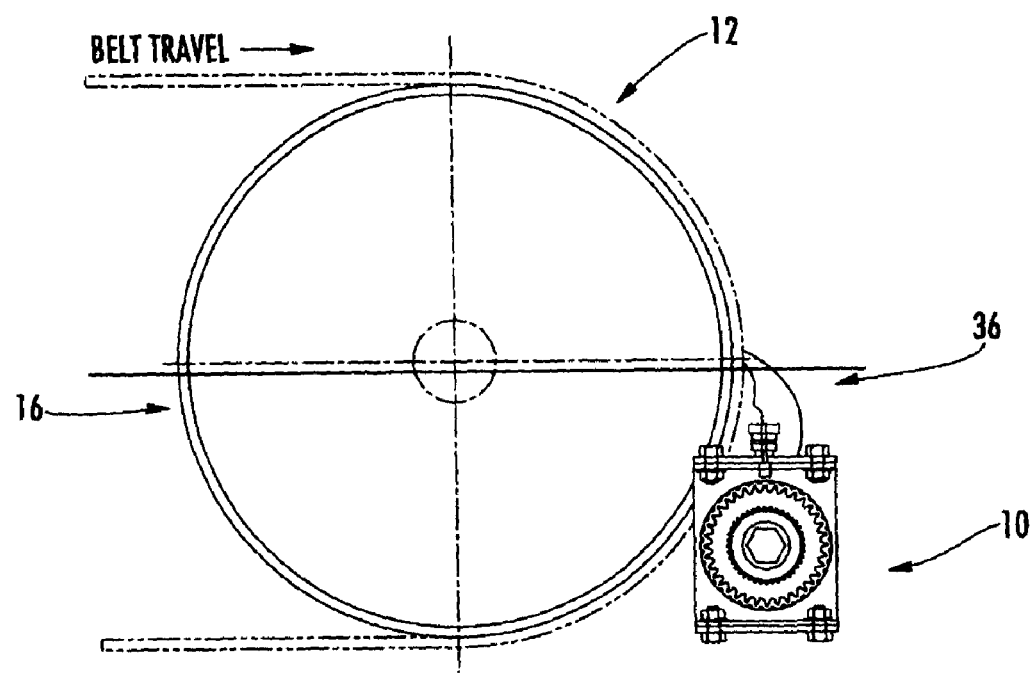
FIG. 3 is a side view of the head pulley and rotatable endless conveyor belt together with the conveyor belt cleaner and tensioning arrangement, in accordance with the present invention.
Figure 4:
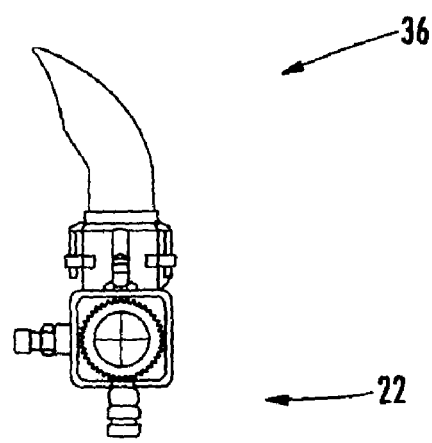
FIG. 4 is a plan side view of the scraper blade and support frame of FIG. 3.

FIG. 3 is a side view of the head pulley 16 and rotatable endless conveyor belt 12 together with the conveyor belt cleaner and tensioning arrangement 10. The scraper blade 36 of the present invention is shown. FIG. 4 is a plan side view of the scraper blade 36 and support frame 22 of FIG. 3.

Figure 5:
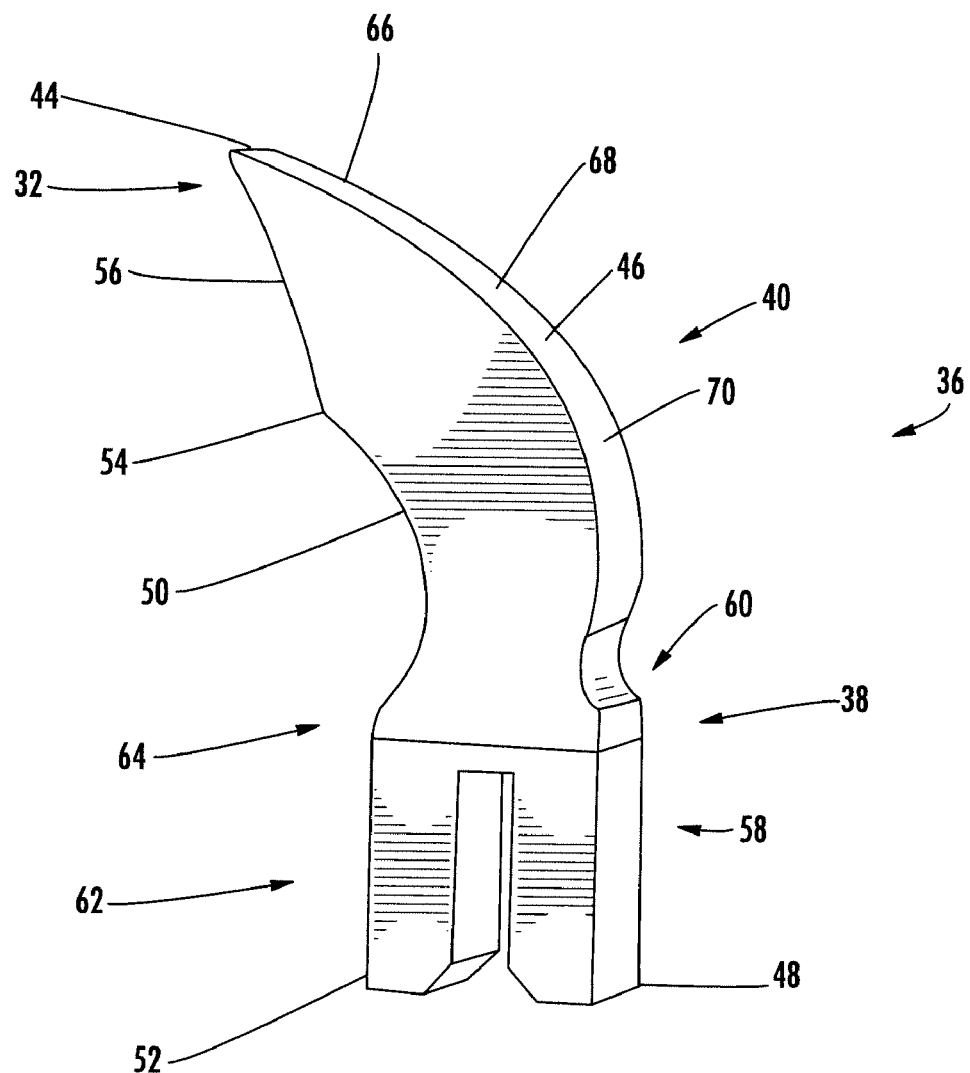
FIG. 5 shows a profile of the scraper blade of the present invention.

FIG. 5 shows a profile of the scraper blade 36 of the present invention. The scraper blade 36 includes a mounting base 38 that is adapted to be removably attached to the mounting bar 32. The scraper blade 36 further includes a blade member 40 extending outwardly from the mounting base 38 to a scraping tip 42. The scraping tip 42 of the blade member 40 includes a distal scraping edge 44. The scraper blade 36 includes a front surface 46 which extends from the front edge 48 of the mounting base 38 to the distal scraping edge 44. The scraper blade 36 also includes a rear surface 50 that extends from the rear edge 52 of the mounting base 38 to a distal edge 54. The scraper blade 36 includes a blade face surface 56 which is curved to conform to the curvature of the conveyor belt 12 such that the entire blade face surface 56 extends between the distal scraping edge 44 and the distal edge 54. The mounting base 38 includes a front leg portion 58 which includes the front edge 48 and a front shoulder 60. The mounting base 38 also includes a rear leg portion 62 which includes the rear edge 52 and a rear shoulder 64. The blade member 40 defines three wear or curve sections. In particular, the blade member 40 includes a distal wear or curve section 66, an intermediate wear or curve section 68 and a proximal wear or curve section 70.

Figure 6:
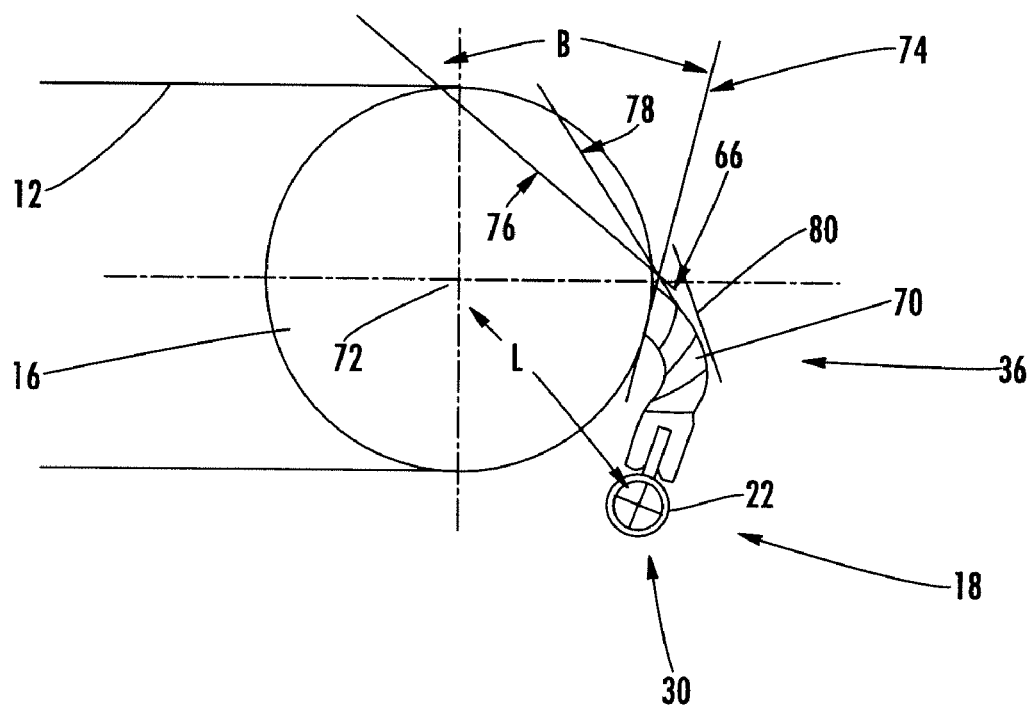
FIG. 6 shows a graphical representation of the blade face surface of the scraper blade, of the present invention, in contact with the conveyor belt at the head pulley.

Referring to FIG. 6, there is shown a graphical representation of the blade face surface 56 of the scraper blade 36 in contact with the conveyor belt 12 at the head pulley 16. The location of the scraper blade 36 shown at the head pulley 16 is a pre-cleaner configuration. The scraper blade 36 is shown coupled to the conveyor belt cleaner 18. The conveyor belt cleaner 18 includes support frame 22 which rotates the scraper blade 36 about the central longitudinal axis 30. The head pulley 16 rotates about a longitudinal axis 72. "L" is the distance between the longitudinal axis 72 of the head pulley 16 and the central longitudinal axis 30 of the scraper blade 36.

FIG. 6 also shows a line 74 which is tangent to the conveyor belt 12 at a point where the blade face surface 56 contacts the conveyor belt 12. A cleaning angle B shown in FIG. 1 is defined between a line 76 tangent to the front surface 46 at the distal curve section 66 and the tangent line 74. FIG. 6 also shows a line 78 tangent to the front surface 46 at the intermediate curve section 68. After the distal curve section 66 is worn, the tangent line 74 and line 78 form the next cleaning angle. FIG. 6 also shows a line 80 tangent to the front surface 46 at the proximal curve section 70. After the intermediate curve section 68 is worn, the tangent line 74 and line 80 form the next cleaning angle. In one embodiment, the angle of the distal curve section 66, intermediate curve section 68 and the proximal curve section 70 are 50, 45 and 40 degrees, respectively. In one embodiment, each of the three cleaning angle sections is used for approximately 15 degrees of rotation before wearing down to the next cleaning angle section. Thus the total rotation for full wear of the three cleaning angle sections is 45 degrees.

Figure 7A:
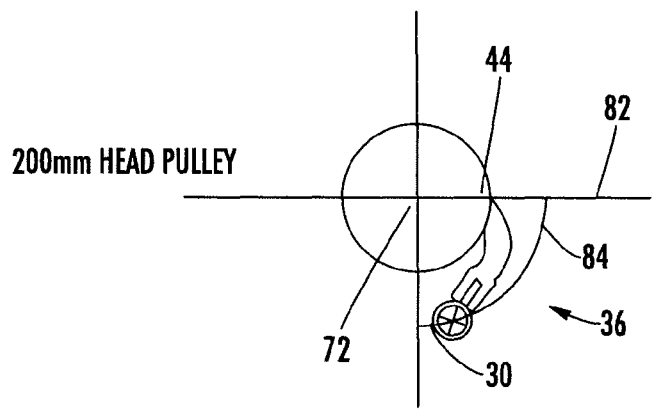
FIGS. 7a, 7b, and 7c disclose the scraper blade of the present invention in applications having a head pulley of different sizes.
Figure 7B:
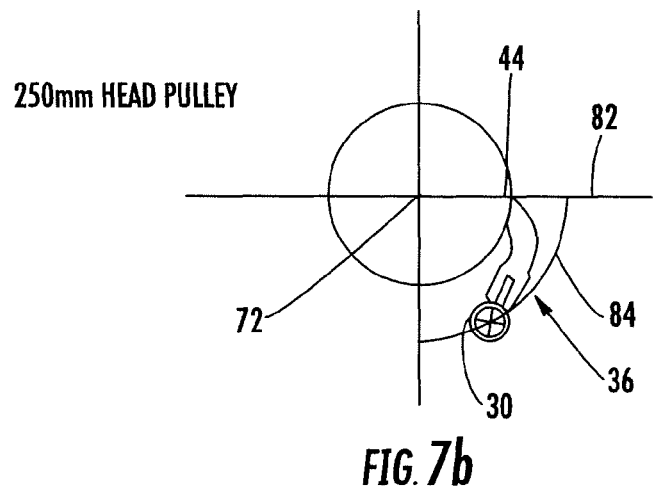
Figure 7C:
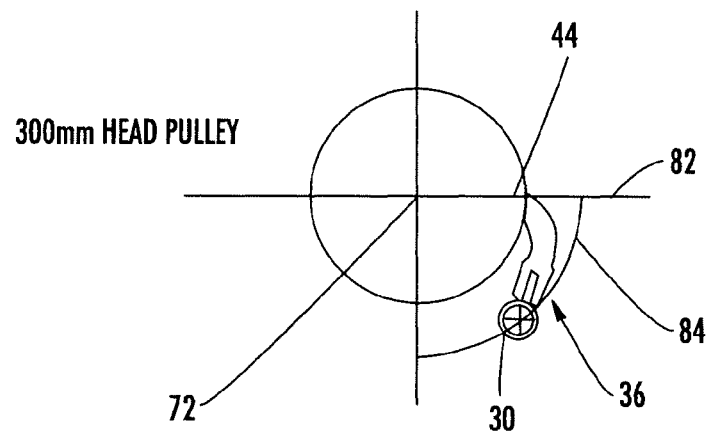

FIGS. 7a, 7b, and 7c disclose the scraper blade 36 of the present invention in applications having a head pulley of different sizes. FIG. 7a shows the scraper blade 36 in contact with a head pulley having a diameter of 200 mm. The distal scraping edge 44 is shown to be in contact with the conveyor belt 12 (not shown in FIGS. 7a, 7b and 7c) at a point where a line 82 extends through the head pulley. The central longitudinal axis 30 of the scraper blade 36 is shown to be a distance L from the longitudinal axis 72. A curved line 84 extends through the axis 30 and maintains a distance L from the axis 72. FIG. 7b shows the scraper blade 36 in contact with a head pulley having a diameter of 250 mm. The distal scraping edge 44 is again shown in contact with the conveyor belt 12 at line 82. However, the location of the axis 30 of the scraper blade 36 is shown higher along the curved line 84. FIG. 7c shows the scraper blade 36 in contact with a head pulley having a diameter of 300 mm. The distal scraping edge 44 is again shown in contact with the conveyor belt 12 at line 82. However, the location of the axis 30 of the scraper blade 36 is shown higher along the curved line 84 than either of the scraper blades 36 in FIGS. 7a and 7b.

In one embodiment of the 300 mm diameter head pulley 16, the mounting distance is 75 mm. The scraper blade 36 thickness is 40 mm. The contact radius is 150 mm. Each of the curved sections 66, 68, and 70 include one or more segments. In this one embodiment, each of the segments is used for approximately 7.5° of rotation. The distal curve section 66 includes 2 segments, each having a cleaning angle of 50°. The intermediate curve section 68 includes 2 segments, each having a cleaning angle of 45°. The proximal curve section 70 includes 2 segments, each having a cleaning angle of 40°. With a total of 6 segments, each having approximately 7.5° of rotation, the scraper blade 36 provides a total rotation for full wear of approximately 45°.

In another embodiment, the distal curve section 66 includes three segments each having a cleaning angle of 50°. The intermediate curve section 68 includes a single segment having a cleaning angle of 45°. The proximal curve section 70 includes two segments each having a cleaning angle of 40°. With a total of 6 segments, each having approximately 7.5° of rotation, the scraper blade 36 provides a total rotation for full wear of approximately 45°. The blade thickness is 32 mm and the blade height is 175 mm.

The curve for each of the curve sections 66, 68 and 70 of the scraper blade may be calculated to define a volute of a circle using an appropriate volute of a circle formula. However, an exact, theoretical curve may potentially be impractical to implement as a physical scraper blade. Accordingly, the present invention contemplates that a tolerance of approximately ten percent (i.e., plus or minus five percent variation, relative to the theoretical curve), may be employed in one or all of the curve sections of the physical scraper blade, as compared to an ideal curve obtained by an appropriate volute of a circle formula. Moreover, exact desired cleaning angles and cleaning pressures may be difficult to achieve or maintain in practice. For example, belts and or pulleys associated with a conveyor system being cleaned by a given scraper blade may wear significantly in thickness over the useful life of the scraper blade. Also, the operator of the scraper blade may potentially select a pulley, belt, or tensioning component (such as a tensioning spring) having different sizes or properties than the pulley, belt and/or tensioning component for which the scraper blade was originally specified for use in conjunction with. Again, a tolerance of approximately ten percent (i.e., plus or minus five percent), relative to a theoretical best curve for a blade segment or an overall blade, and desired cleaning angles and pressures, is considered to be acceptable, in view of the above-mention variations which may occur in pulley size, belt thickness, and/or tensioning components.

The present invention also comprises a process for designing the profile of a scraper blade having an outside profile comprised of a plurality of segments, each approximating a volute of a circle, and a software-based tool for automating the implementation of this process. Both inner and outer surface profiles of the scraper blade (as viewed from the side of the scraper blade, along its longitudinal axis) may be designed using the steps of the present invention. Moreover, both primary scraper blades and secondary scraper blades may be so designed. The primary blades meet the conveyor belt as the belt travels around a pulley. This primary blade is the first to contact the bulk materials as they are removed from the belt. The blade applies sufficient pressure to the conveyor belt to remove debris that may have accumulated on the belt, prior to that portion of the belt making its return trip around the overall conveyor. The secondary blade is generally disposed beneath the pulley and removes additional debris that the primary blade may have missed.

As it is the profile of the blade that is designed using the steps of the present invention, the design process is performed 2-dimensionally, using coordinates along the x and y axis. The width of the blade (W), the only dimension along the z-axis, is only considered for purposes of modeling three dimensional contact areas, and the pressures and forces upon a blade designed by the method of the present invention. The center of the pulley is always assumed to be at the origin, point zero (0, 0) on the x-y axes. The initial contact point of the primary blade is on the x-axis at point (x, 0), where x is the radius of the pulley (for design purposes, the thickness of the conveyor belt is presumed to be zero). The initial contact point of the secondary blade is on the y-axis at point (0,−y), where y is the radius of the pulley.

Figure 8:
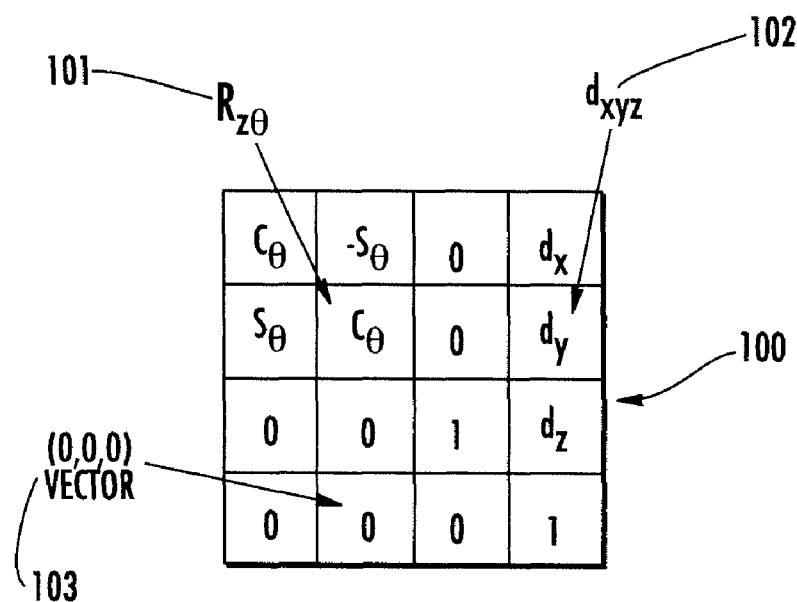
FIG. 8 is a diagram of a homogeneous transformation matrix employed in the automated scraper blade design process of the present invention.

A series of homogeneous transformation matrices 100 (i.e., transformation matrices having homogeneous coordinates), as shown in FIG. 8, are employed in designing the present scraper blades having a profile comprising a plurality of line segments, each line segment approximating a volute of a circle. The transformation matrix allows a translation to be performed during the automated design process. It also can indicate the current position of the profile features. The homogeneous transformation matrices are used to automatically develop different coordinate frames as the blade is being constructed. Each homogeneous transformation matrix includes a rotation matrix 101, a translation vector 102, and a zero vector 103, and is used to rotate a segment, or a chain of multiple segments, of the overall blade under construction. Each rotation matrix is limited to a rotation about the Z-axis, inasmuch as a 2-dimensional blade profile is being constructed.

Figure 9:
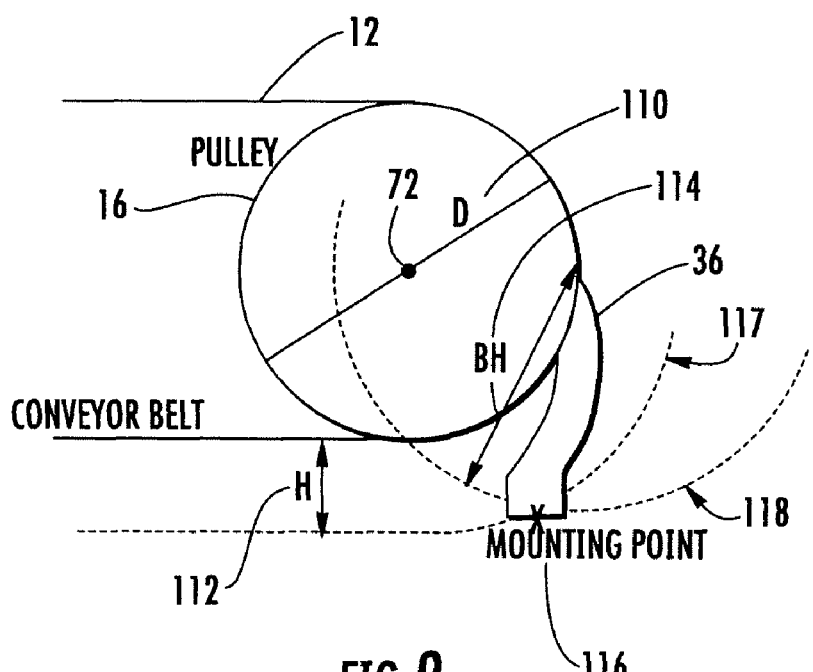
FIG. 9 is diagram graphically illustrating the calculation of a primary blade mounting point.

As shown in FIG. 9, the coordinate of a mounting point ("MP") 116, or point of rotation for the overall scraper blade 36, is first determined. As the blade profiles are being calculated, many steps are taken that rotate the blade about this mounting point. The mounting point is defined differently for a primary and a secondary scraper blade. However the basic concept is the same. Beginning with the primary blade mounting point, to determine this point, a blade height circle 118, with the radius of the blade height ("BH") 114, is created at the initial blade point (D/2, 0), where D 110 is the diameter of pulley 16. Next, the conveyor belt 12 is offset by an offset value ("H") 112 to create belt offset circle 117. The intersection of the blade height circle 118 and the belt offset circle 117 defines the mounting point 116 for a primary scraper blade. In particular, mathematically, the x and y coordinates for the mounting point of a primary scraper blade, given specified blade height, offset value, and pulley diameter, with the origin defined to be the center, or position of the longitudinal axis of the pulley, are determined as follows:

$$MP_y = -\sin\left[\cos^{-1}\left[\frac{-(BH)^2 + (D/2)^2 + (D/2+H)^2}{2*(D/2)*(D/2+H)}\right]\right]*(D/2+H) \quad (1)$$

$$MP_x = \sqrt{(D/2+H)^2 - MP_y^2} \quad (2)$$

Figure 10:
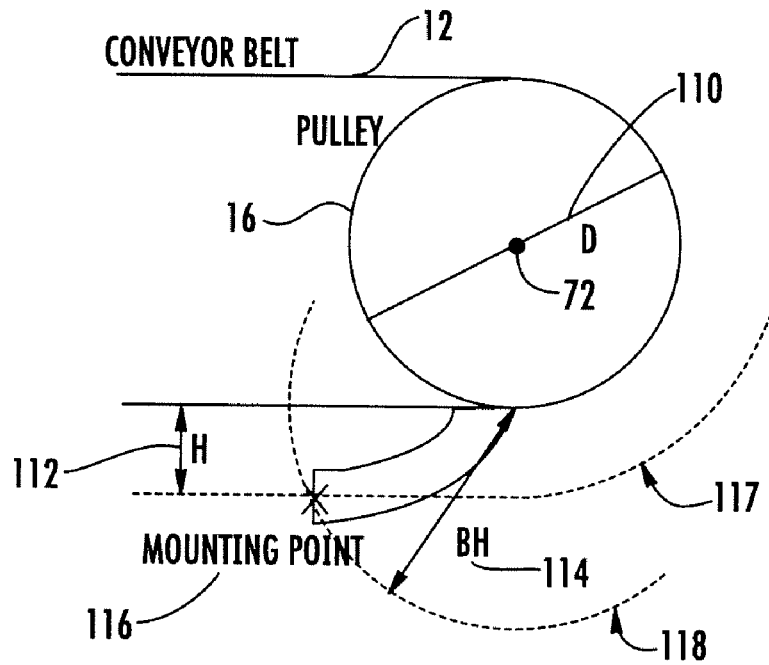
FIG. 10 is a diagram graphically illustrating the calculation of a secondary blade mounting point.

The determination of the position of a mounting point 116 for a secondary scraper blade is shown in FIG. 10. A blade height circle 118 with the radius of the blade height, BH 114, is created at the initial blade point (0,−D/2). Next, the conveyor belt 112 is again offset by the offset value, offset H 112. The intersection of the blade height circle 118 and the belt offset circle 117 defines the secondary mounting point 116. In particular, mathematically, the x and y coordinates for the mounting point of a secondary scraper blade, given specified blade height, offset value, and pulley diameter, with the origin defined to be the center, or position of the longitudinal axis of the pulley, are determined as follows:

$$MP_y = -(D/2+H) \quad (3)$$

$$MP_x = \sqrt{(BH)^2 - H^2} \quad (4)$$

Figure 11:
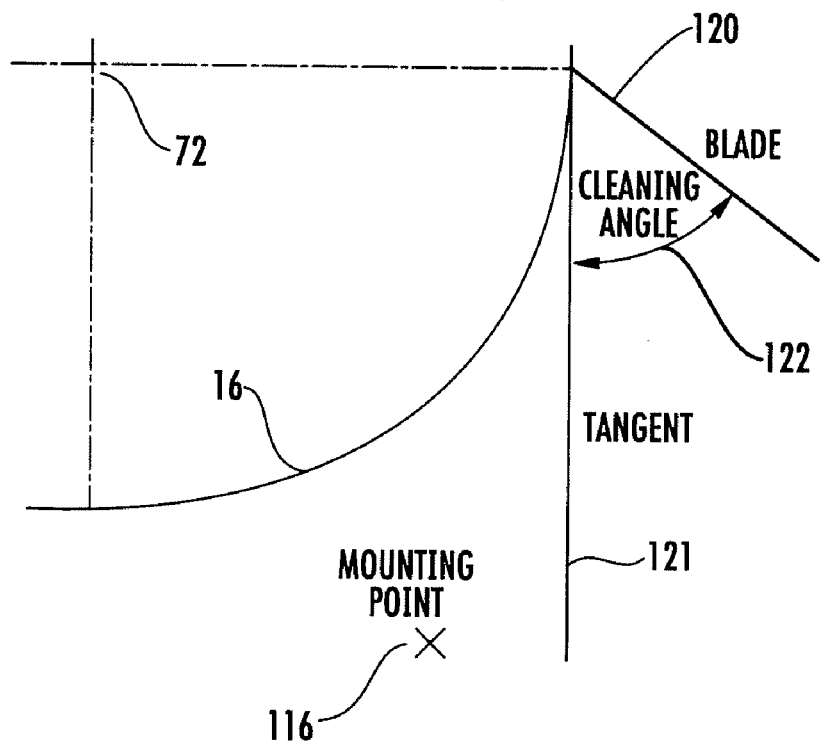
FIG. 11 is a diagram illustrating the placement of the first segment in the automated design of an outer profile of a scraper blade.
Figure 12:
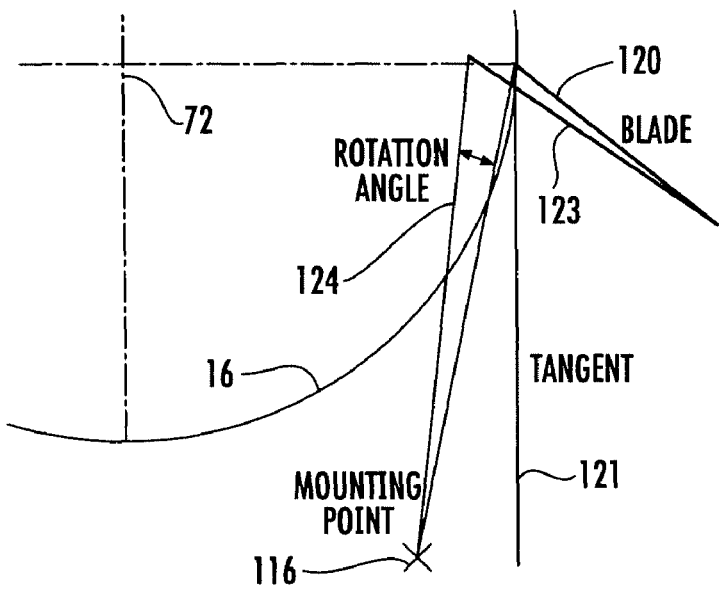
FIG. 12 is diagram illustrating the rotation of the segment of FIG. 11 about the mounting point by a portion of an overall rotation angle.

The steps in designing the outer profile for both the primary and secondary blades is similar, and are graphically depicted, in the case of a primary scraper blade, in FIGS. 11-19. As shown in FIG. 11, following the determination of an appropriate mounting point, the next step is the creation of the first blade segment 120. Beginning at the starting point of the blade, (D/2, 0) for the primary blade, a line segment 120 is mathematically created and modeled at a desired first segment cleaning angle 122, relative to the intersection of tangent line 127, intersecting pulley 16 at coordinate (D/2, 0). Next, as shown in FIG. 12, the first blade segment 120 is rotated by the rotation angle 124, and is shown repositioned following rotation as rotated first blade segment 123. Rotation angle 124 comprises a fraction of an overall desired total rotation angle of the scraper blade being designed, as the blade rotates against the conveyor belt and pulley from a new condition to a fully worn condition, divided by the total number of segments to be included in the scraper blade, such that each segment undergoes substantially equivalent degrees of rotation as it is worn through contact with the conveyor belt.

Figure 13:
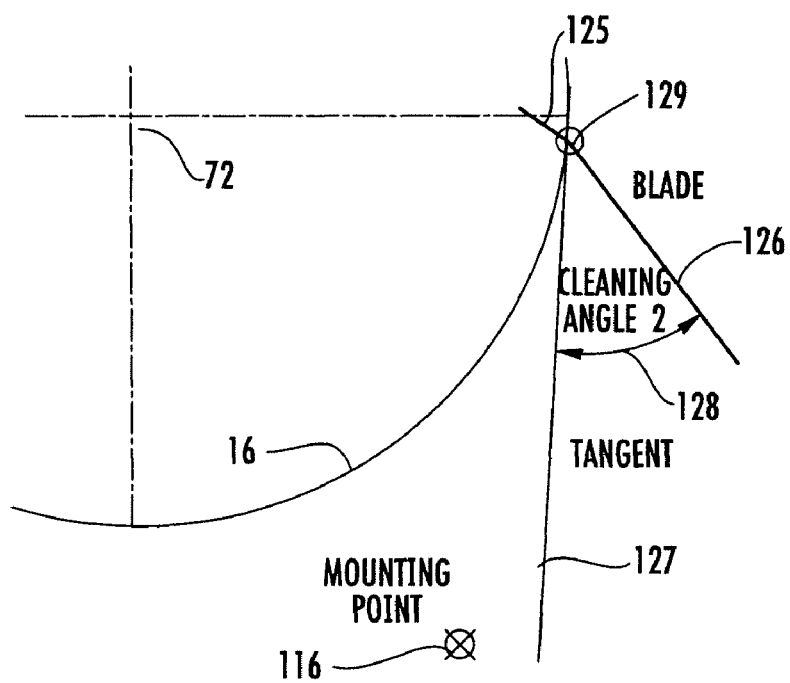
FIG. 13 is a diagram illustrating the trimming of the segment of FIG. 12 at the intersection of the pulley, and the placement of the second segment in the automated design of the outer profile of a scraper blade.

Next, after rotation, and as shown in FIG. 13, the rotated blade segment is trimmed at the intersection of the rotated blade segment with pulley 16, depicted as point 129, to form trimmed blade segment 125. Only that portion of trimmed blade segment 125, disposed within the perimeter of pulley 16, is retained, and the remainder of the rotated blade segment is discarded. Next, at intersection point 129, a new line 127, tangent to the circle of pulley 16, is established, and a new, second segment 126, adjacent trimmed blade segment 125, is created by a desired second segment cleaning angle 128 between tangent line 127 and blade segment line 126.

Figure 14:
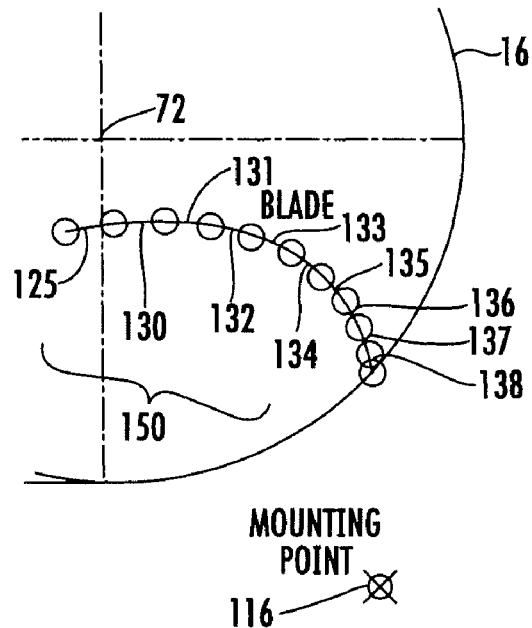
FIG. 14 is a diagram illustrating the repetition of the steps depicted in FIGS. 12 and 13 for a desired number of total segments in the automated design of the outer profile of a scraper blade.

Next, as shown in FIG. 14, the foregoing steps illustrated in FIGS. 12 and 13 are repeatedly performed, to add as many additional segments as desired, each at a respective desired cleaning angle, by repeatedly rotating all of the accumulated segments, trimming the most recently added segment at its intersection with the pulley, and then adding a new segment, at a desired cleaning angle relative to a tangent of the pulley intersection. In FIG. 14, added and trimmed segments 125, 130, 131, 132, 133, 134, 135, 136, 137 and 138 are shown, forming a full chain of segments 150, with circles drawn at the endpoints of each segment. Of course, fewer or additional segments may be used in any given design.

Figure 15:
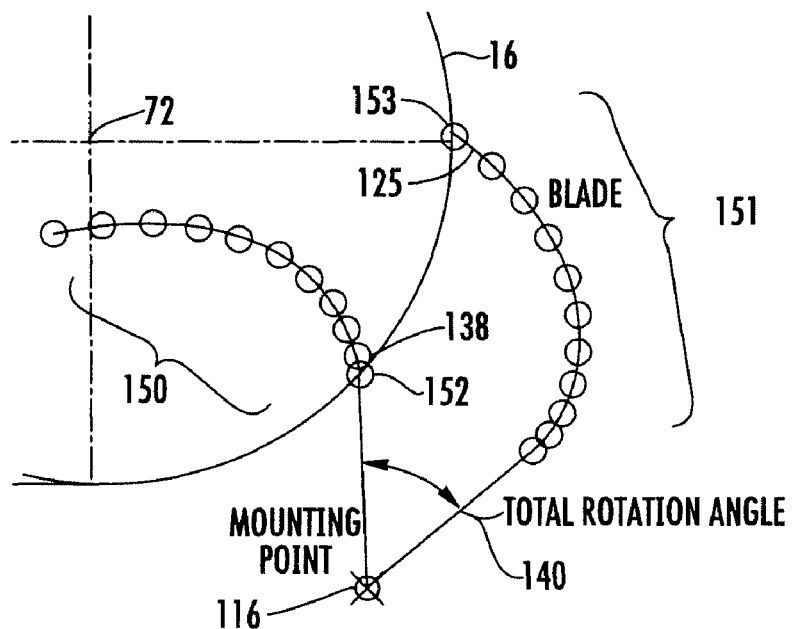
FIG. 15 is a diagram illustrating the rotation of all generated segments back to an initial starting point in the automated design of the outer profile of a scraper blade.

Next, as shown in FIG. 15, once all of the segments have been created, the chain of segments 150 is rotated back to the starting point to form rotated segments 151, thus completing the design of the outer profile of the scraper blade. In particular, a line is drawn from the point of intersection 152 between the last added segment 138 and pulley 16 and the mounting point 116, for a degree of rotation equal to total rotation angle 140, until an endpoint 153 of the very first rotated and trimmed segment 125 intersects pulley 16, as shown in FIG. 15.

In a preferred embodiment, ten to fifteen blade segments may be modeled in this manner. A smooth curve may then be fitted so as to intersect the endpoints of each segment, in order to create the overall outer and inner profiles of a scraper blade to be manufactured. In particular, the endpoints of each modeled segment yields coordinates that intersect the volute lines of the scraper blade to be manufactured, and curve fitting features of conventional computer aided drafting software, such as AutoCAD, may produce a fitted curve intersecting these endpoint coordinates, substantially approximating a volute of a circle, within a tolerance of approximately plus or minus five percent of the theoretical volute curve.

While the steps in generating the scraper blade outer profile have been described and depicted in graphical form above, the underlying mathematical principles will now be discussed. In order to automatically calculate the outer profile, a series of homogeneous transformation matrices are created and then iteratively applied for the desired number of segments. Beginning at the origin (0, 0), or the center of the pulley, the identity matrix represents this position and orientation. A translation is then made to the mounting point, in which a new coordinate frame is established. This coordinate frame is then rotated by the desired rotation angle, which is denoted by $\alpha$, where:

$$\alpha_1 = a\tan2\left(\frac{D}{2} - x_m, y_m\right) \quad (5)$$

A translation of an offset length, L, defined as:

$$L_1 = \sqrt{\left(\frac{D}{2} - x_m\right)^2 + (-BH)^2} \quad (6)$$

is then performed along the coordinate frame's axis to the point at which the segment begins after it has been rotated. The linear equation for this segment is then defined by its slope, m, and y-intercept, b:

$$m_1 = \tan(\text{Rot} - \theta_1) \quad (7)$$

$$b_1 = y_3 - m_1 x_3 \quad (8)$$

where Rot-$\theta_1$ is the first orientation angle and is defined by the total rotation minus $\theta_1$, and where $$\theta_1 = \left(\frac{\pi}{2} - CA_1\right) \quad (9)$$

The new starting point of the first segment is defined by ($x_3$, $y_3$) and the point at which the segment intersects the pulley is defined as a circle point, ($CPx_1$, $CPy_1$). Using the slope-intercept form of the segment line:

$$y = mx + b \quad (10)$$

and the equation of a circle for the pulley:

$$x^2 + y^2 = (D/2)^2 \quad (11)$$

the intersection is determined. In order to orient the frame along the segment a rotation of the orientation angle, $\theta$ is used. A translation of the length of the segment, defined as:

$$L_{segment1} = \sqrt{(CPx_1 - x_3)^2 + (CPy_1 + y_3)^2} \quad (12)$$

is used to translate the frame to the circle point. Finally, the tangent angle for the next segment is then calculated using the circle point values $$\text{TangentAngle}_2 = a\tan2(Px_1, Py_1) \quad (13)$$

Once each of these steps is completed, the process is iteratively repeated for each successive segment and the chain of segments is completed based on the desired number of total segments to be created. The last step is to rotate each segment in the final chain of segments back to the starting position that defines the outer profile points. This is achieved by orienting the profile points about the mounting point by a rotation defined by:

$$\text{Rotation} = \cos(\alpha_{n+1} - \text{Rotation Angle} * \text{Segment } n) \quad (14)$$

where n is 1 for the first segment. After the frame is oriented, a translation equal to the following segment's offset length, $L_{n+1}$, is used to determine an outer profile point ($P_1$, $P_2$).

The foregoing has described, in both graphically depicted and mathematical terms, the design of an outer profile of a primary conveyor belt scraper blade. The design of an outer profile of a secondary conveyor belt scraper blade's outer profile is performed in an almost identical manner. The only differences are that the design begins at coordinate (0, -D/2), and the tangent angles remain constant. This is due to the secondary scraper blade lying flat against the belt instead of radially around the curved pulley.

Figure 16:
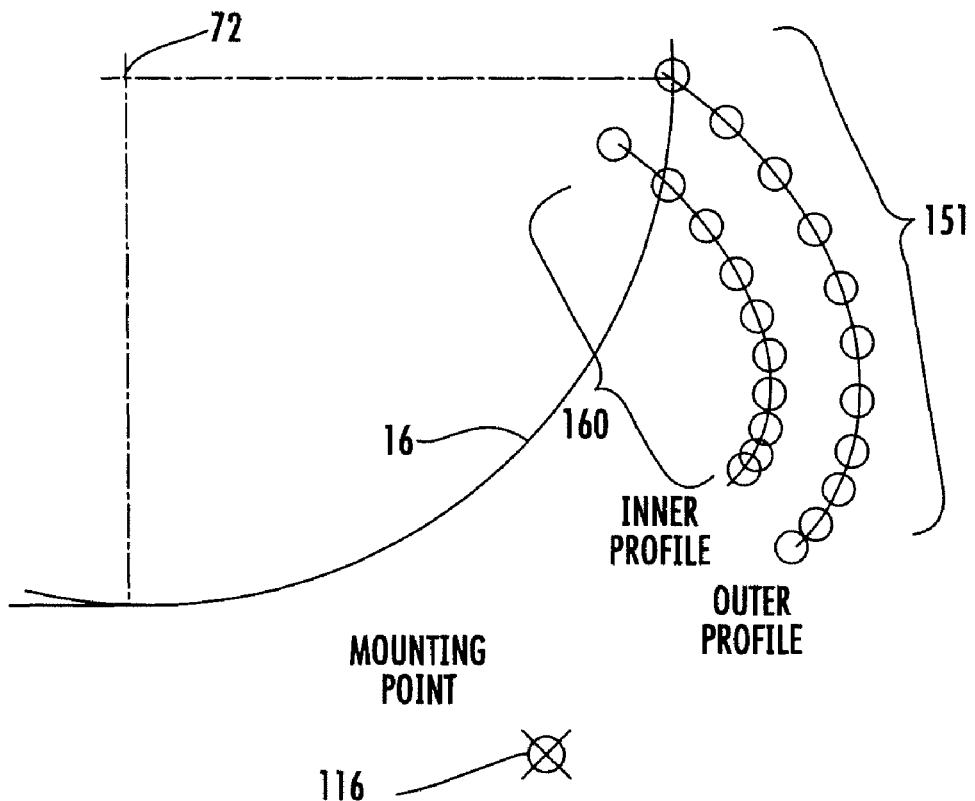
FIG. 16 is a diagram illustrating the offset of the outer profile in the automated design the create the inner profile of a scraper blade.
Figure 17:
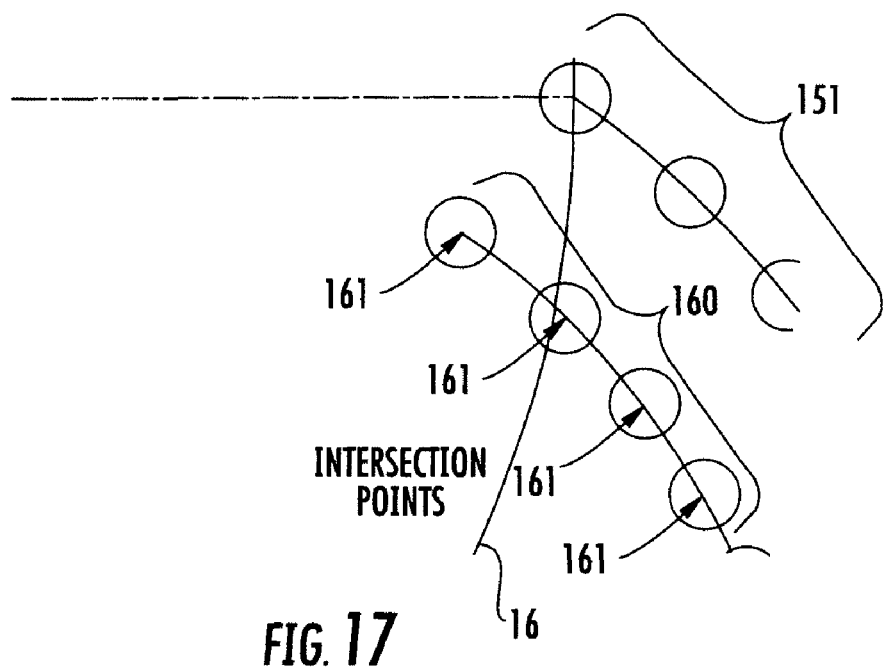
FIG. 17 is a diagram illustrating the creation of inner profile points, collectively offset from the intersection points of segments of the outer profile in the automated design of the inner profile of a scraper blade.

Designing the inner profile in accordance with the present invention requires that the outer profile first be defined pursuant to the process identified above. The inner profile is essentially an offset of the previously defined outer profile by a selected input value known as the inner profile offset, as shown in FIGS. 16-17. In particular, a series of intersection points 161 of the offset segments 160 are derived from corresponding intersection points of the final outer profile blade segments 151 forming inner profile points ($IP_{x1}$, $IP_{y1}$).

The mathematical formula for determining the inner profile points will now be described. For each intersection point or inner profile point, the equation for both segment lines that create the intersection must be defined. The initial segment used is defined by two consecutive outer profile points. A frame is created at each of these outer profile points and is oriented according to the following equation:

$$\beta = \text{COS(Orientation Angle} - \pi/2 - \text{Rotation Angle} * \text{Segment } n) \quad (15)$$

where $\beta$ is the rotation perpendicular to the outer profile segment. In each of these frames a translation equal to the inner profile offset is introduced, thereby defining the endpoints of the offset segment or inner profile segment. These calculations are repeated for the next segment and then the line equations for both of these segments are used to equate the intersection. This intersection is the inner profile point. In order to define the entire inner profile, the intersections for every consecutive segment are successively determined in the same manner. Once these steps are performed, a preliminary design for the entire inner and outer profile of a scraper blade has been obtained. Next, contact areas are determined in association with simulated blade wear, and forces and pressures exerted upon the designed blade are calculated.

Figure 18:
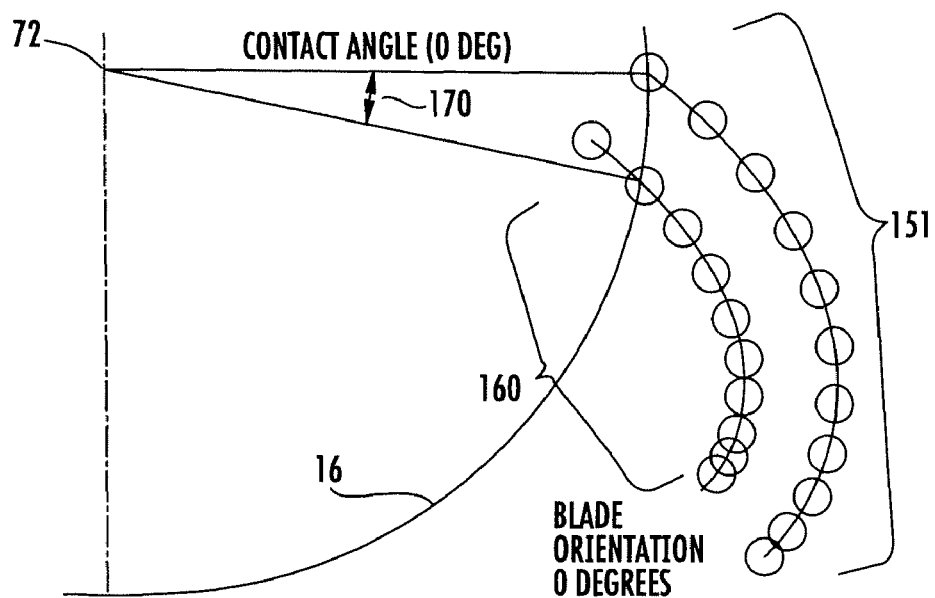
FIG. 18 is a diagram illustrating the determination of an initial contact angle of a segment of the designed scraper blade with a simulated pulley.
Figure 19:
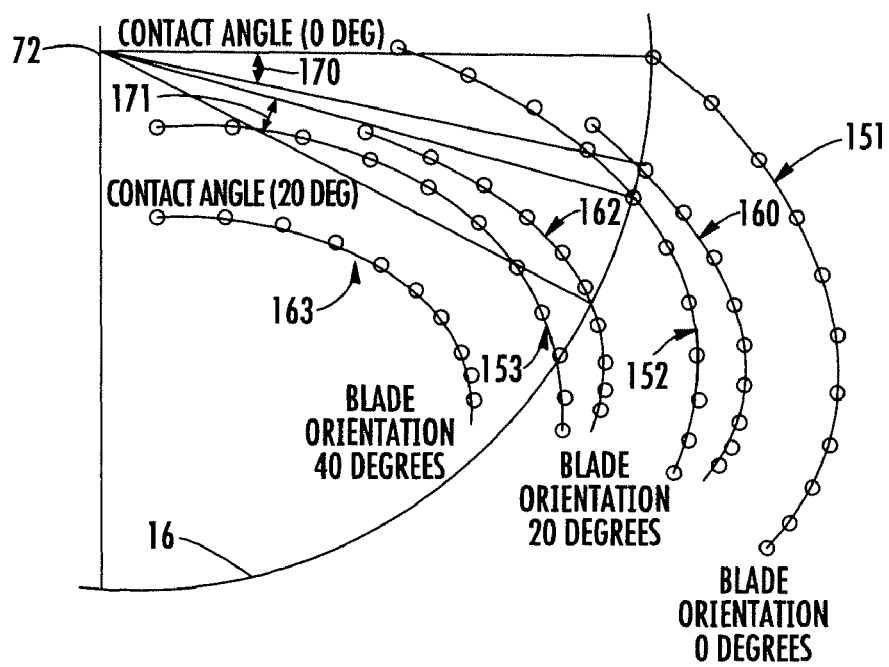
FIG. 19 is a diagram illustrating the determination of a plurality of subsequent contact angles of segments of the designed scraper blade with a simulated pulley as wear of the designed scraper blade is simulated.

As shown in FIG. 18, once the inner blade profile 160 and outer blade profile 151 have both been defined as described above in accordance with the present invention, the contact angle 170 can be determined between the intersection of outer profile 151 with pulley 16 and the intersection of inner profile 160 with the pulley 16. This defines the angle that the blade makes when it is in contact with the conveyor belt. While FIG. 18 depicts the initial contact angle of a newly-created simulated blade in contact with a pulley, FIG. 19 further depicts changes in the contact angle as blade wear is simulated. Initially, the blade has traveled through zero degrees of rotation, as depicted by outer blade profile at position 151, inner blade profile at position 160, and contact angle 170. As shown in FIG. 19, as the blade wears, the contact angle changes from angle 170 to 171, as the blade travels through 20 degrees of rotation, to outer blade profile position 152 and inner blade profile position 162. Moreover, the intersection points for the inner and outer profiles change, as well. As shown in FIG. 19, after 40 degrees of blade rotation to outer profile position 153 and inner profile position 163, the inner profile is no longer defined (i.e., it is modeled entirely within the perimeter of pulley 16) and contact angles can no longer be determined. Also, referring to FIG. 19, in order to calculate the intersection for the inner profile, the particular blade segment within the overall chain of inner profile blade segments that actually intersects the conveyor belt must be known. However, the uncertainty of knowing which inner blade segment intersects the conveyor belt is directly dependent on the magnitude of the inner profile offset. Increasing the inner profile offset will shift that intersection point, and perhaps shift it enough that the intersection will lie within a subsequent blade segment.

The determination of each contact angle is obtained by simulating the blade as it wears. This is achieved by rotating both the inner and outer profiles towards the belt by a rotation angle until a total rotation angle is reached. For example, if a ten segment profile is being designed and modeled in accordance with the present invention, and a total rotation angle of 50 degrees is specified, then the blade profiles will be calculated at each 5 degree interval. The intersection points of both the inner and outer profiles with the conveyor belt will then be calculated. The outer profile comprises the circle points determined for the outer profile earlier. Therefore, the first of two bounds for the contact angle have been identified. The inner profile, as described above, yields an uncertainty regarding precisely which inner blade segment intersects the pulley. Therefore, for each blade segment, a linear equation is calculated using the process described above concerning the creation of the inner profile section. All segment line equations are then recalculated for each rotation. Accordingly, an overall quantity of segment line equations, equal to the square of the number of line segments included in the outer (and inner) profile, must be calculated.

In order to determine which of these segments intersects the pulley diameter, the magnitude of each segment is calculated. If the magnitude of a segment is the first to be greater than the pulley radius, then that segment defines the intersection of the inner profile at that specific blade wear rotation. This process is repeated for each rotation, and once these inner segments are determined, the inner profile intersection can be determined. Once again, this intersection is computed using the two general equations for a line and a circle (equation numbers 10 and 11 above). With the two profile intersection points defined, the contact angle can be calculated using the equation:

$$ContactAngle = \cos^{-1}\left(\frac{x_{intersection}}{D/2}\right) - \cos^{-1}\left(\frac{CirclePoint_x}{D/2}\right) \quad (16)$$

Once the contact angle has been calculated, the contact area can then be determined using the following equation:

$$\text{ContactArea} = \text{ContactAngle} * D/2 * \text{WidthofBlade} \quad (17)$$

Calculations for the secondary blade contact areas are performed in a slightly different manner. Since the secondary blade contacts the conveyor belt at a position where the belt is flat, rather than curved around a pulley, a contact arc is irrelevant. The linear distance from the circle point to the intersection for the inner profile is therefore the length that defines the contact area. Multiplying that length by the desired width of the blade yields the secondary scraper blade contact area.

Figure 20:
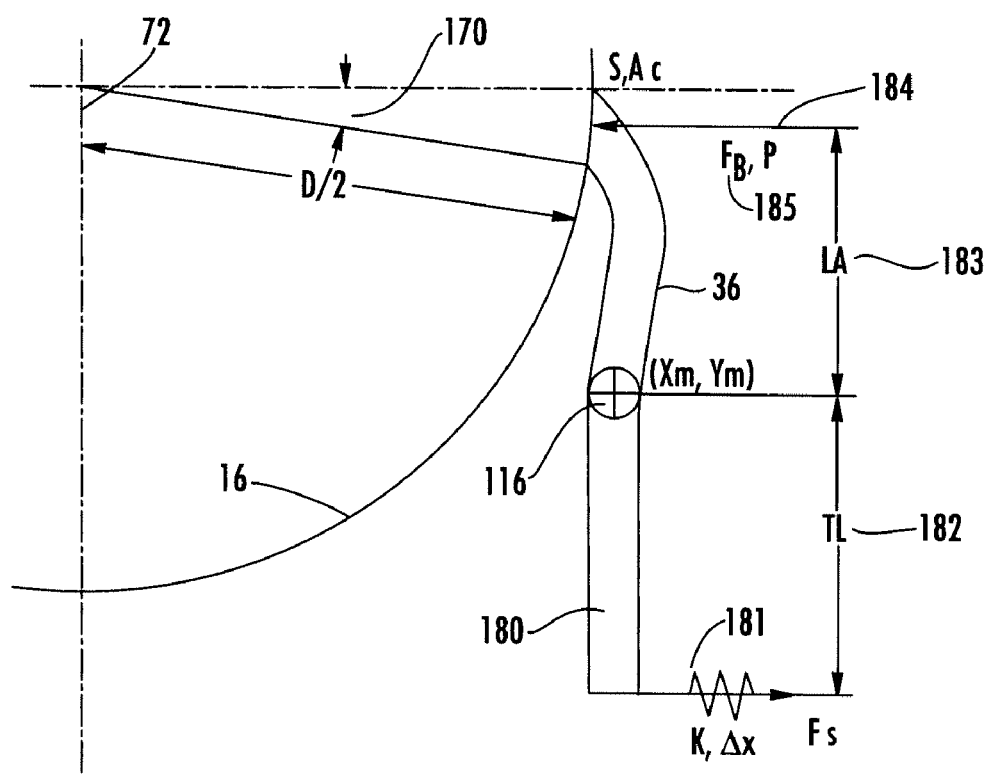
FIG. 20 is a diagram illustrating a designed scraper blade in conjunction with a simulated spring tensioner, and the moment balance between the spring tensioner and the forces exerted by the designed scraper blade.

Determining the pressure at each blade segment is dependent upon the associated contact areas previously calculated, and the contact force that the blade exerts upon the conveyor belt. This pressure and force is simulated in association with a model of an overall scraper blade and tensioner arrangement including the designed scraper blade, as shown in FIG. 20. The blade force is determined by calculating a moment balance with the force that a hypothetical spring exerts in the tensioner that is modeled. First, an initial approximate pressure P 184 is manually specified. Using this pressure, P 184, an approximate blade force, $F_B$ 185 is calculated for each segment using the following equation:

$$F_B = P \cdot A_c \quad (18)$$

where $A_c$ is the contact area for that particular scraper blade segment, determined according to the steps identified above. By the moment balance, a spring force, $F_S$ 181 is then determined using the following equation:

$$F_s = \frac{F_B \cdot LA}{TL} \quad (19)$$

where LA is the lever arm 183, or distance from the mounting point 116 to the center of the contact area, and TL is the tensioner length 182, or the radius of a hypothetical tensioner hub 180. From the calculated spring force, an approximate average spring constant, $k_{avg}$, is then calculated using the following equation:

$$k_{avg} = \frac{F_{s,avg}}{\Delta x} \quad (20)$$

where $\Delta x$ is the deflection distance of the spring. This deflection is approximated as:

$$\Delta x = TL \cdot \theta \quad (21)$$

where $\theta$ is defined as the degree of rotation of the simulated scraper blade between segments. By knowing the average spring constant, an actual spring constant, $k_{chosen}$ is then chosen, using a conventional industrial standard known to be available for use in the application of the particular scraper blade being designed and having a spring constant value approximating the calculated average spring constant as closely as possible. Based upon this chosen spring constant, the pressure for each of the segments is determined, again using equations 18-20, but this time working backwards, in reverse order. A spring compression ratio may optionally be employed, and used in the calculations, to provide a relatively coarse estimate of the length of the spring at rest. This length, SL, is defined by the following equation:

$$SL = \Delta x_{total} / \text{ratio} \quad (22)$$

Notably, the foregoing equations and steps may be employed to calculate blade pressures for both primary and secondary conveyor belt scraper blades under design.

The present invention also comprises a software-based tool for implementing the steps, processes and equations described above for designing the profile of a scraper blade having a profile comprising a plurality of segments, each approximating the volute of a circle, for simulating wear of the scraper blade, and for modeling pressures and forces exerted upon the scraper blade and an associated contact area of a conveyor belt. Moreover, this software-based tool also permits manual modifications to certain parameters of an automatically-designed blade, permitting the user to adjust the resultant blade design to achieve, for example, more uniform contact area pressure between the scraper blade and the conveyor, throughout the simulated blade wear.

In a preferred embodiment, the software-based tool is implemented using Microsoft Excel spreadsheet software, customized to provide user input dialogs and graphical display output using Microsoft's Visual Basic for Applications (commonly known as "VBA") programming language. Of course, the software-based tool of the present invention may alternatively be implemented using any of a variety of available software programming languages and software development platforms.

Figures 21, 22:
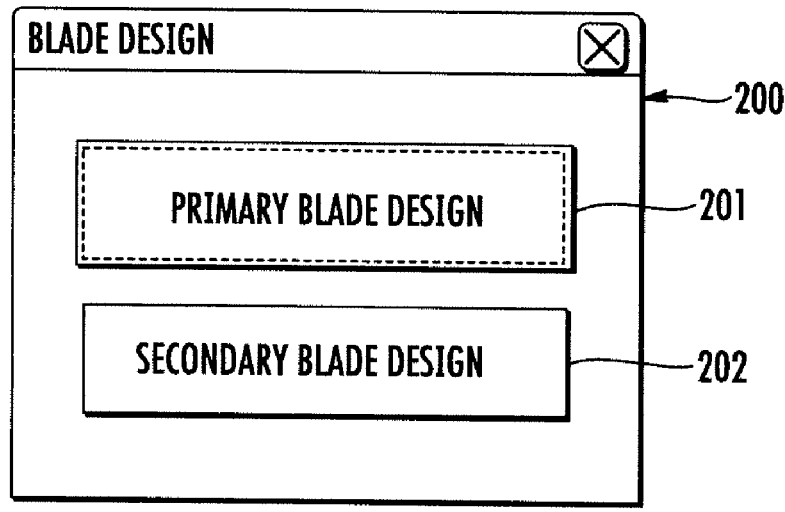
FIG. 21 is an initial selection dialog presented by a scraper blade design automation tool of the present invention.
FIG. 22 is a design parameter input dialog of the scraper blade design automation tool.

First, a user activates, or opens, the software-based tool. The user is presented with a dialog 200 as shown in FIG. 21, permitting the user to indicate that either a primary scraper blade or a secondary scraper blade is to be designed, by clicking on button 201 or 202, respectively. While the following discussion will discuss in detail the use of the present software-based tool in conjunction with the design of a primary scraper blade, it will be understood that the software-based tool likewise implements the related steps, process and equations in the design and simulation of secondary scraper blades.

Next, the user is presented with dialog 210 as shown in FIG. 22, permitting the user to enter the following data as input parameters for the scraper blade under design: D (Diameter of Pulley) 211 is the diameter of the pulley that the primary blade will contact; BH (Blade Height) 212 is the radial distance from the initial point of the very tip of the blade to the mounting point, the tip of the blade being defined to be on the surface of the pulley directly across from the center of the pulley; H (Mounting Offset) 213 is the shortest distance between the surface of the pulley and the mounting point; Number of Segments 214 determines the number of iterations the software-based tool will use to define the profile of the blade; and Total Blade Rotation Angle 215 is defined as the total amount of rotation the blade will experience before it fully wears. Once all of this data has been entered, the user clicks the continue button 216.

Next, the user is presented with dialog 220 as shown in FIG. 23, permitting data entry of the following: CA (Cleaning Angle) 221, 222, 223, 224, and 225, each defining an angle of attack at which the blade meets the pulley; and Inner Profile Offset 226, specifying, in millimeters, the physical offset of the inner profile to be generated, relative to the outer profile. While five cleaning angle data entry boxes are depicted in FIG. 23, the actual number presented to the user will vary in accordance with the number of segments specified by the user in the immediately prior date entry dialog 210 of FIG. 22, with each segment having an associated cleaning angle. Once all of this data has been entered, all data necessary to automatically design the profile of a scraper blade has been collected, and the user clicks the create blade design button 227 to proceed.

At this time, the software-based tool may implement the previously-described mathematical formulae and homogeneous transformation matrices to construct a mathematical model of the scraper blade. However, additional data is instead gathered to simulate blade wear in conjunction with pressure and forces placed upon the blade in conjunction with a simulated spring tensioner. As shown in FIG. 230, Dialog 230 is next presented to collect data for pressure calculations, including data entry of the following: P (Pressure Estimate) 230, a user-specified coarse estimate of the pressure the user would like the simulated blade to exert on the belt and pulley system; L (Tensioner Length) 232, the radius of a simulated hub of a tensioning system; and W (Blade Width) 233, providing a third, "Z" dimension of the simulated scraper blade, which, in addition to the generated blade profile, permits the calculation of a plurality of areas of the blade in contact with the pulley, with a separate area calculation was wear is simulated for each segment. This, in turn, permits associated calculations of the force exerted by the blade contact area upon the conveyor belt and pulley. Once all of this data has been entered, the user clicks the pick a spring constant button 234.

Next, spring constant dialog 240, shown in FIG. 25, is presented to the user. A calculated average spring constant, determined using equations numbers 18-20 above, is presented to the user at position 241 of this dialog. This dialog then collects data relative to the spring tensioner to be simulated, including the following: K (Chosen Spring Constant) 242, defines the properties of the simulated spring that will be used with in conjunction with a simulated overall tensioning system and the presently designed scraper blade, and preferably comprises a spring constant of a conventional, commercially available spring suitable for use in association with an actual tensioning system, and which has a spring constant value relatively close in magnitude to calculated average Spring Constant 241; and Spring Compression Ratio 243, used to provide an estimate for a desirable spring length for use in conjunction with the designed scraper blade. Once all of this data has been entered, the user clicks the finalize blade design button 244.

Now that all necessary data has been collected, not only to design the profile of the scraper blade, but also to simulate wear and pressure forces on the blade, the software-based tool implements the mathematical formulae and homogeneous transformation matrices, according to the steps described above, to design a profile of a primary or secondary scraper blade, and to model the pressure that it exerts upon a conveyor belt and pulley in association with both simulated blade wear and a simulated conveyor belt scraper blade tensioning system. For a primary scraper blade design, this information is presented to the user in the output display 250 of FIG. 26.

Figure 26:
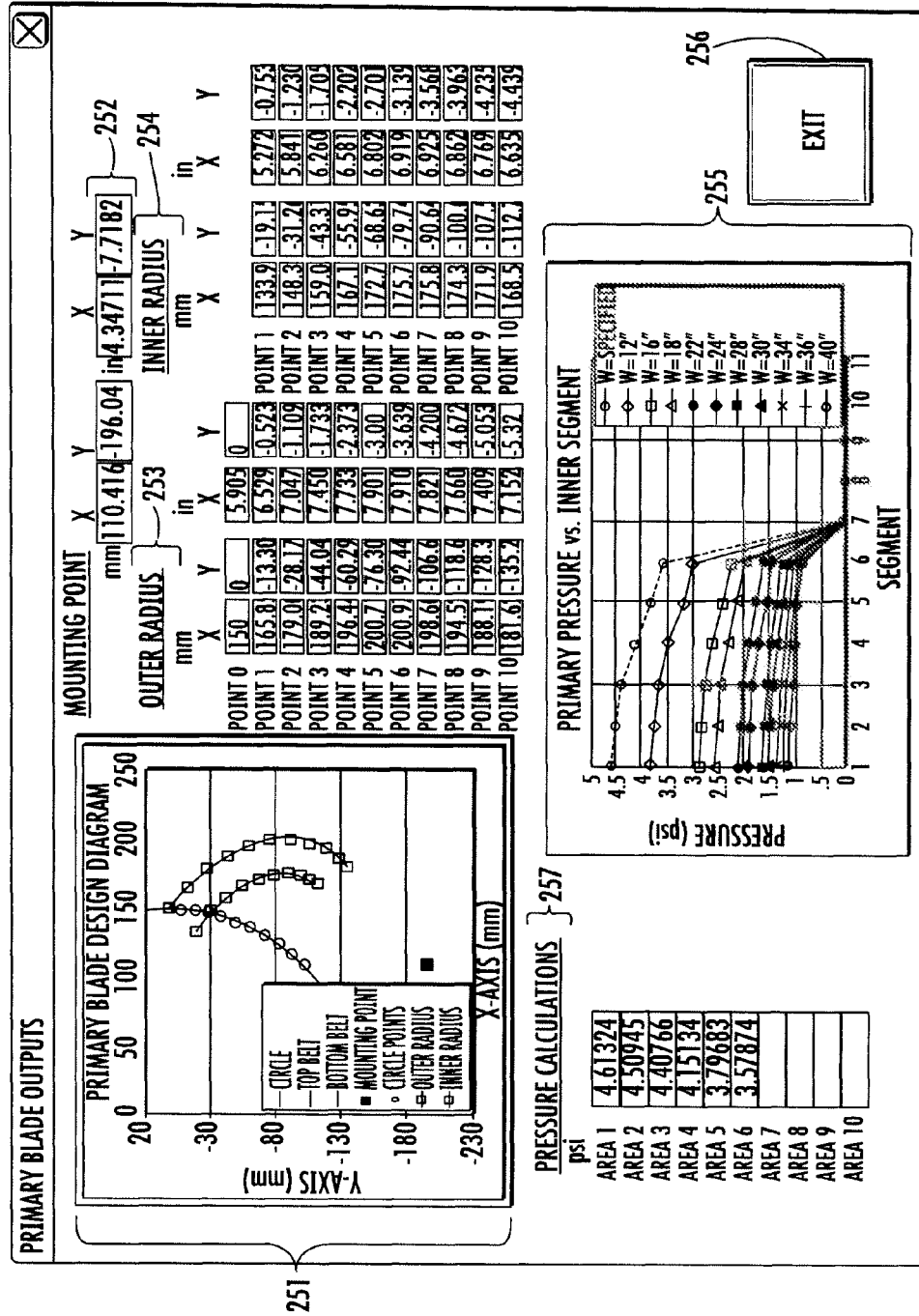
FIG. 26 is a screen capture of the results of a primary scraper blade designed using the scraper blade design automation tool.

As shown in FIG. 26, output display 250 includes primary blade design diagram 251, mounting point data 252, outer profile radius data 253, inner profile radius data 254, primary pressure versus inner segment diagram 255, and pressure calculations 257. Primary blade design diagram 151 graphically depicts all of the generated segments, and their associated endpoints, for both the inner and outer profile of the designed scraper blade, by drawing curves plotted to intersect each segment endpoint, drawn as open squares in FIG. 26. Moreover, in FIG. 26, the computed mounting point is depicted as a solid square, a portion of the circumference of the pulley is indicated as an arc, and the circle points (i.e., the positions on the pulley/conveyor belt that are contacted by the various segments of the designed scraper blade as it wears) are identified by diamond-shaped indicia.

The mounting point data 252 identifies the x-y coordinates of the mounting point, in units of both millimeters and inches. Outer profile radius data 253 identifies the x-y coordinates of each endpoint of the calculated segments of the outer profile, in units of both millimeters and inches. Likewise, inner profile radius data 254 identifies the x-y coordinates of each endpoint of the calculated segments of the inner profile, in units of both millimeters and inches.

Pressure calculations 257 identify the contact area pressure, in units of pounds per square inch, exerted by the scraper blade upon the pulley and conveyor belt, as the designed scraper blade undergoes simulated wear from segment to segment, until there are no longer any segments capable of contacting the pulley and conveyor belt as the scraper blade is rotated under tension about the mounting point. These pressure calculations are graphically depicted in primary pressure versus inner segment diagram 255. Several lines are plotted, all showing contact area pressure, in pounds per square inch, for progressive segments in the designed scraper blade undergoing simulated wear. The dashed line of diagram 255 depicts a simulated scraper blade having the width entered by the user in data entry 233 of dialog 230 (FIG. 24). The remaining plotted lines of diagram 255 depict other simulated scraper blades, all having the same profile dimensions, but having predetermined widths, in the "Z" dimension, of 12, 16, 18, 22, 24, 28, 30, 34, 36 and 40 inches, respectively. This permits the user to quickly ascertain the effects of blade width on contact area pressure, both initially and after subsequent blade wear occurs. Pressing exit button 256 ends the graphic display of the constructed blade and simulated wear and pressure.

Figure 27:
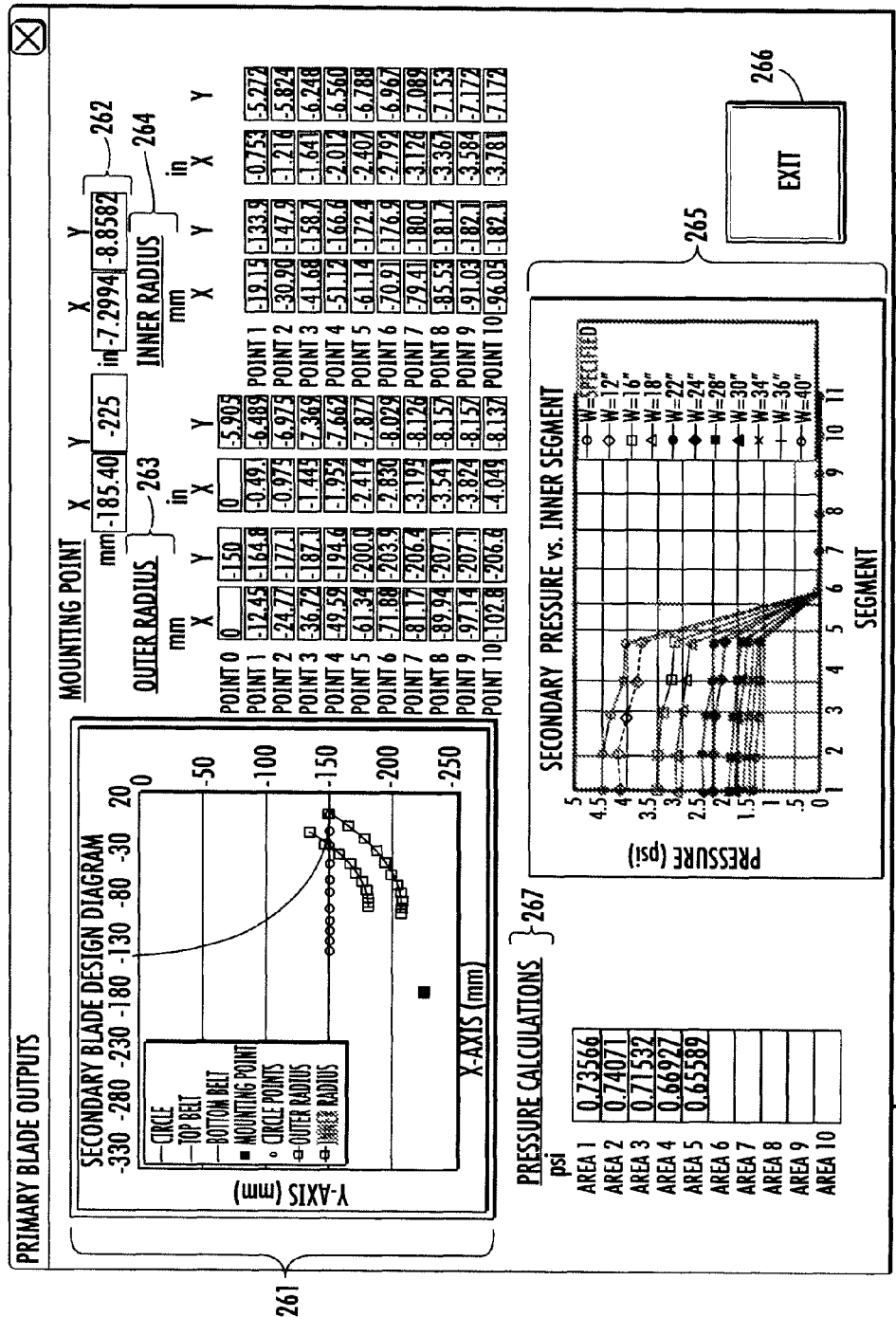
FIG. 27 is a screen capture of the results of a secondary scraper blade designed using the scraper blade design automation tool.

If a secondary, rather than a primary scraper blade has been designed, the results of the design and wear/pressure simulation is presented to the user in the output display 260 of FIG. 27. As shown in FIG. 27, output display 260 includes primary blade design diagram 261, mounting point data 262, outer profile radius data 263, inner profile radius data 264, primary pressure versus inner segment diagram 265, and pressure calculations 267. Pressing exit button 266 ends the graphic display of the constructed blade and simulated wear and pressure.

Once the user has exited the primary or secondary blade output display, the underlying data for the output displays, including both the initial input data entered by the user in the various dialogs, as well as all of the calculated data of the various inner and outer profile blade segments, contact areas, and contact pressures during simulated blade wear, are all stored and editable within cells of the Excel spreadsheet. This permits the user to rapidly make modifications to the input data, and to view the results of those modifications in a revised primary or secondary blade output display. For example, a user may make modifications to previously specified cleaning angles, in order to obtain a more uniform set of contact pressures, as the blade undergoes simulated wear and progressive blade segments come into contact with the simulated pulley and conveyor belt surface.

As can been seen, the present mathematical process for designing the profile of a scraper blade, and associated software-based tool, is used to generate a series of segments that fit a particular design criteria. Primary variables, including mounting distance, blade height, cleaning angle and the number of blade segments to be generated can be changed by the designer, to generate a family of segments that meet the overall design criteria. A scraper blade designer will then fit these theoretical blade segments into one or more curves to be implemented as the profile of the physical scraper blade.

The curve may be generated for a larger segment that what will be used for the actual scraper blade, to reduce potential issues with segment end points. For example, a desired design segment for a wear portion of a scraper blade may be 45 degrees, with steps in the iteration process being increments of 5 degrees. In such a case, a scraper blade designer may choose a 50 or 55 degree arc to generate a theoretical curve, with the understanding that only a portion of the calculated length of that arc will be used in the scraper blade manufactured from the theoretical design.

Once the theoretical coordinates of a scraper blade have been created using the process and/or software-based tool of the present invention, these coordinates may be exported to conventional, commercially available computer aided drafting ("CAD") software, such as AutoCAD or ProE. Such off the shelf CAD software typically provide curve fitting functionality with several options, including, for example, "best fit method", or "fit curve to include data points". Several alternative curve fitting methods may be performed and compared, towards selecting the most suitable curve for use in manufacturing the mold for the scraper blade. The designer may also consider whether a simple curve, such as an arc or ellipse, will suitably fit the theoretical data points. Generally, a final decision on which curve to use is based, in part, on a designer's judgment of which curve shape may be easiest to use in manufacturing a mold. Moreover, the final selection of a curve may be based, at least in part, on aesthetics.

Often, the difference between the curves resulting from various alternative curve fitting functions may be minimal. However, in some cases, certain curve fitting functions may result in clearly unsuitable curves, such as those that double back upon themselves, particularly at end points of the curve. Moreover, any curve fit within a tolerance of ten percent (i.e., plus or minus 5 percent variation from the plotted points of the generated blade segments) is considered to be acceptable.

Next, the curve is typically adjusted for anticipated shrinkage of the blade material. Generally, a mold is manufactured to dimensions that are oversized by approximately one to two percent, to allow for shrinkage of the blade material. Accordingly, the coordinate location of the final curve is generally offset from one to two percent to arrive at the final shape used for making the mold for the scraper blade. Finally, the blade designer completes the shape of the overall scraper blade, by adding mounting base portions, blending the non-wear portions of the overall blade into the wear curve at their junction, using either regular curves or straight lines, typically using an automated "trim" function of the CAD software.

Next, the fitted and adjusted blade shape is used to generate the final coordinates for the scraper blade mold. The body of mold may then be machined from a solid block of metal, such as aluminum. Alternatively, an extrusion die may made from aluminum using computer controlled machining methods, with the resultant extrusion forming the body of the mold. In either case, the manufactured mold is then finished by a tool and die maker with the addition covers, clamps, fill holes and any other changes or additions needed to create a usable mold.

Once a usable mold has been manufactured, scraper blade samples are manufactured using the mold, and these samples are checked against the drawing (i.e., the final coordinates created using the CAD software). Since the curves usually have no direct reference point on the mold itself (such as a circle center or curve radius of gyration) the scraper blade samples are typically visually compared to a blueprint, by printing out a full size CAD drawing and physically placing the scraper blade samples on the drawing.

Any one of the foregoing manufacturing steps may potentially result in the introduction of some errors. Moreover, small variations may typically occur between molds, if more than a single mode is created for volume scraper blade production. Accordingly, as discussed above, a resulting manufactured scraper blade is generally considered to be acceptable if the final, resulting curve in the manufactured blade does not vary by more than plus or minus five percent, relative to the desired theoretical curve.

The foregoing description and drawings merely explain and illustrate the present invention and the invention is not limited thereto, except insofar as the following claims are so limited, as those of skill in the art will be capable of making changes, modifications, and enhancements thereto, without departing form the scope of the invention.

What is claimed is:

1. A scraper blade for a conveyor belt cleaner, the scraper blade being adapted, when appropriately tensioned against a conveyor belt, to achieve a plurality of predetermined cleaning angles, relative to the conveyor belt, as the scraper blade is progressively worn down through contact with the conveyor belt, the scraper blade comprising:
   a first wear section proximate a distal end of the scraper blade, the first wear section being configured to maintain a first predetermined cleaning angle relative to the conveyor belt; and
   a second substantially adjacent the first wear section, the second wear section being configured to maintain a second predetermined cleaning angle, relative to the conveyor belt, after the first wear section is worn away through contact with the conveyor belt;
   wherein the second predetermined cleaning angle is different than the first predetermined cleaning angle; and
   wherein the scraper blade further comprises a third wear section substantially adjacent the second wear section, the third wear section being configured to maintain a third predetermined cleaning angle, relative to the conveyor belt, after the first and second wear section have both been worn away through contact with the conveyor belt, wherein the third predetermined cleaning angle is different than at least one of the first and second cleaning angles.

2. The invention according to claim 1, wherein the first predetermined cleaning angle is approximately 50 degrees.

3. The invention according to claim 2, wherein the second predetermined cleaning angle is approximately 45 degrees.

4. The invention according to claim 1, wherein the third predetermined cleaning angle is less than the second predetermined cleaning angle and the second predetermined cleaning angle is less than the first predetermined cleaning angle.

5. A scraper blade for a conveyor belt cleaner, the scraper blade being adapted, when appropriately tensioned against a conveyor belt, to maintain a plurality of predetermined cleaning angles, relative to the conveyor belt, as the scraper blade is progressively worn down through contact with the conveyor belt, the scraper blade comprising:
   a first wear section proximate a distal end of the scraper blade, the first wear section being configured to maintain a first predetermined cleaning angle relative to the conveyor belt;
   a second wear section substantially adjacent the first wear section, the second wear section being configured to maintain a second predetermined cleaning angle, relative to the conveyor belt, after the first wear section is worn away through contact with the conveyor belt, the second predetermined cleaning angle being different than the first predetermined cleaning angle;
   wherein a surface of at least one of the first wear section and the second wear section has a profile that is substantially curvilinear in shape.

6. The invention according to claim 5, wherein the second predetermined cleaning angle is less than the first predetermined cleaning angle.

7. A scraper blade for a conveyor belt cleaner, wherein the scraper blade comprises a first wear section and a second wear section, the first wear section having a first curvilinear outer surface approximately corresponding to a first volute of a first circle, and the second wear section having a second curvilinear outer surface corresponding to a second volute of a second circle, the first and second circles being of different diameters.

* * * * *